United States Patent
Ambrosi et al.

(10) Patent No.: US 11,351,973 B2
(45) Date of Patent: Jun. 7, 2022

(54) BISTABLE SOLENOID VALVE AND METHOD FOR ASSEMBLING A BISTABLE SOLENOID VALVE

(71) Applicant: Robert Bosch GmbH, Stuttgart (DE)

(72) Inventors: Massimiliano Ambrosi, Abstatt (DE); Edgar Kurz, Heilbronn-Horkheim (DE); Wolf Stahr, Abstatt (DE); Wolfgang Schuller, Cleebronn (DE); Klaus Landesfeind, Bangalore (IN); Michael Eisenlauer, Affalterbach (DE)

(73) Assignee: Robert Bosch GmbH, Stuttgart (DE)

( * ) Notice: Subject to any disclaimer, the term of this patent is extended or adjusted under 35 U.S.C. 154(b) by 33 days.

(21) Appl. No.: 16/617,313

(22) PCT Filed: Jun. 11, 2018

(86) PCT No.: PCT/EP2018/065325
§ 371 (c)(1),
(2) Date: Nov. 26, 2019

(87) PCT Pub. No.: WO2019/020260
PCT Pub. Date: Jan. 31, 2019

(65) Prior Publication Data
US 2020/0262410 A1   Aug. 20, 2020

(30) Foreign Application Priority Data
Jul. 26, 2017 (DE) ..................... 10 2017 212 820.8

(51) Int. Cl.
*F16K 31/06*   (2006.01)
*F16K 31/08*   (2006.01)
(Continued)

(52) U.S. Cl.
CPC ........ *B60T 15/028* (2013.01); *F16K 31/0655* (2013.01); *F16K 31/082* (2013.01);
(Continued)

(58) Field of Classification Search
CPC ...... F16K 31/08; F16K 31/082; F16K 31/084; F16K 31/086; F16K 31/0655;
(Continued)

(56) References Cited

U.S. PATENT DOCUMENTS

| 3,895,331 | A | * | 7/1975 | Saarem | ................. H01F 7/1607 |
| | | | | | 335/253 |
| 4,403,765 | A | * | 9/1983 | Fisher | .................. F16K 31/082 |
| | | | | | 137/625.65 |

(Continued)

FOREIGN PATENT DOCUMENTS

| CN | 110891835 A | 3/2020 |
| DE | 102 02 628 A1 | 8/2003 |

(Continued)

OTHER PUBLICATIONS

International Search Report corresponding to PCT Application No. PCT/EP2018/065325, dated Aug. 29, 2018 (German and English language document) (8 pages).

*Primary Examiner* — Matthew W Jellett
(74) *Attorney, Agent, or Firm* — Maginot, Moore & Beck LLP

(57) ABSTRACT

A bistable solenoid valve for a hydraulic brake system has a guide sleeve in which an upper immovable pole core is fixedly arranged and a closing element is displaceably arranged. The closing element is forced into a valve seat during a closing movement and lifts off from the valve seat during an opening movement, and is fixedly connected to a magnet assembly. An actuation of the movement of the closing element is performed by the magnet assembly via a coil positioned around and substantially surrounding the guide sleeve. A lower immovable pole core is fixedly arranged in the guide sleeve and the magnet assembly is positioned between the lower and the upper pole core.

14 Claims, 3 Drawing Sheets

(51) Int. Cl.
*B60T 15/02* (2006.01)
*H01F 7/02* (2006.01)
*H01F 7/08* (2006.01)
*H01F 7/16* (2006.01)
*H01F 27/24* (2006.01)
*H01F 27/28* (2006.01)
*B60T 8/36* (2006.01)

(52) U.S. Cl.
CPC ............... *H01F 7/02* (2013.01); *H01F 7/081* (2013.01); *H01F 7/16* (2013.01); *H01F 27/24* (2013.01); *H01F 27/28* (2013.01); *B60T 8/363* (2013.01)

(58) Field of Classification Search
CPC ............. F16K 31/0675; F16K 31/0668; B60T 15/028; B60T 8/363; H01F 7/122
USPC ................................................ 251/65, 129.15
See application file for complete search history.

(56) References Cited

U.S. PATENT DOCUMENTS

| | | | | |
|---|---|---|---|---|
| 4,422,060 A * | 12/1983 | Matsumoto | ............... | H01F 7/13 335/234 |
| 4,524,797 A * | 6/1985 | Lungu | ................... | F16K 31/082 137/343 |
| 5,734,310 A * | 3/1998 | Ankney | ................. | H01F 7/121 335/228 |
| 5,947,155 A * | 9/1999 | Miki | ..................... | H01F 7/1615 137/625.65 |
| 7,004,446 B2 * | 2/2006 | Petro | ..................... | F16K 31/086 251/63.4 |
| 8,540,208 B2 * | 9/2013 | Alvarez | ................ | F16K 31/082 251/65 |
| 2001/0029986 A1 * | 10/2001 | Anderson | ............. | B60T 8/3665 137/625.65 |
| 2005/0006611 A1 * | 1/2005 | Choi | ................... | F16K 31/0655 251/65 |
| 2005/0100625 A1 * | 5/2005 | Tooman | ............... | B29C 45/281 425/564 |
| 2013/0284955 A1 * | 10/2013 | Kocourek | .............. | B60T 8/363 251/65 |

FOREIGN PATENT DOCUMENTS

| | | |
|---|---|---|
| DE | 10 2011 006 218 A1 | 10/2012 |
| EP | 0 572 155 A1 | 12/1993 |
| JP | 557-029108 U | 2/1982 |
| JP | 57029108 U * | 2/1982 |
| JP | 557-177510 A | 11/1982 |
| JP | S61-37572 A | 2/1986 |
| JP | H04-18406 A | 2/1992 |
| JP | H06-249359 A | 9/1994 |
| JP | H10-196832 A | 7/1998 |
| JP | 2012-102832 A | 5/2012 |
| WO | 02/10628 A1 | 2/2002 |
| WO | 2008/110436 A1 | 9/2008 |
| WO | 2010/124755 A1 | 11/2010 |
| WO | 2015/006483 A1 | 1/2015 |

* cited by examiner

BISTABLE SOLENOID VALVE AND METHOD FOR ASSEMBLING A BISTABLE SOLENOID VALVE

This application is a 35 U.S.C. § 371 National Stage Application of PCT/EP2018/065325, filed on Jun. 11, 2018, which claims the benefit of priority to Serial No. DE 10 2017 212 820.8, filed on Jul. 26, 2017 in Germany, the disclosures of which are incorporated herein by reference in their entirety.

The present disclosure relates to a bistable solenoid valve for a hydraulic brake system, comprising a guide sleeve in which an upper non-moving pole core is arranged in a fixed manner and a closing element is arranged in a movable manner, wherein the closing element enters a valve seat during a closing movement and lifts out of the valve seat during an opening movement, and the closing element is connected to a magnet assembly in a fixed manner, wherein actuation of the movement of the closing element by means of the magnet assembly takes place by way of a coil which is positioned around the guide sleeve and substantially encloses said guide sleeve, wherein the solenoid valve is characterized in that a lower non-moving pole core is arranged in the guide sleeve in a fixed manner and the magnet assembly is positioned between the lower and the upper pole core.

BACKGROUND

In a hydraulic unit, solenoid valves have the task of retaining the pressure medium or allowing said pressure medium to flow out. They typically consist of a plurality of solenoid valves. In the case of solenoid valves in ABS/TCS/ESP systems of motor vehicles, certain requirements in respect of leaktightness are in place for the closed state, said requirements being dependent on the respective task of the solenoid valve in the system. The valves are generally designed such that, depending on the function, a permanent position is achieved in a deenergized switching position (for example "closed" in a deenergized state) and the valve is energized only for short-term operation (for example "open" in the energized state).

The prior art further discloses bistable valves which achieve a permanent position in a deenergized state in two switching positions and are energized only for the switching process between the permanent positions. In this respect, reference may be made to patent application WO 02/10628 A1 for example.

SUMMARY

In contrast, the solenoid valve according to the disclosure advantageously renders possible efficient holding and switching of the valve.

According to the disclosure, this is rendered possible owing to the features specified herein.

The bistable solenoid valve according to the disclosure for a hydraulic brake system, comprising a guide sleeve in which an upper non-moving pole core is arranged in a fixed manner and a closing element is arranged in a movable manner, wherein the closing element enters a valve seat during a closing movement and lifts out of the valve seat during an opening movement, and the closing element is connected to a magnet assembly in a fixed manner, wherein actuation of the movement of the closing element by means of the magnet assembly takes place by way of a coil which is positioned around the guide sleeve and substantially encloses said guide sleeve, is characterized in that a lower non-moving pole core is arranged in the guide sleeve in a fixed manner and the magnet assembly is positioned between the lower and the upper pole core.

This is understood to mean that the solenoid valve has two pole cores between which a magnet assembly is positioned. In this case, the pole cores are fixedly defined in their position and the magnet assembly can move between the pole cores. In this case, the magnet assembly is connected to the closing element of the solenoid valve in a fixed manner. The closing element, also called sealing element, serves to allow passage at the valve seat and therefore to open the valve in a first position, and to block passage at the valve and therefore to close the valve in a second position. The solenoid valve is bistable. This means that holding the closing element in these two different positions (that is to say in the closed position and also in the open position) can take place without permanent energization. In the case of a bistable valve, only a changeover of the switching state is rendered possible by energizing the coils. Holding the closing element in the respective closed or open position takes place, for example, by the magnet assembly. To this end, the magnet assembly consists, for example, of an upper permanent magnet, which is situated physically closer to the upper pole core, and a lower permanent magnet, which is situated physically closer to the lower pole core. In this case, the valve or the closing element is held in the open position by the upper permanent magnet at the upper pole core. Analogously, the valve, or the closing element, is held in the closed position by the lower permanent magnet at the lower pole core. In this way, the valve can advantageously be held in the respective position in an energy-efficient manner.

Changing between the two stable positions takes place owing to a movement of the closing element. To this end, the coil is energized with a defined voltage. A magnetic field is created as a result. The pole coils consist, for example, of a material which has ferromagnetic properties. The closing element itself consists of a non-magnetizable material, in particular of plastic. Therefore, the coil magnetizes the upper and the lower pole core. On account of their temporary magnetization, the upper and the lower pole core have an influence on the magnet assembly, so that the associated closing element is moved to the desired position. By way of example, the closing element with the magnet assembly (in the case of a corresponding position and energization of the coil) can be repelled by the lower pole core and attracted by the upper pole core. Or, as an alternative, said closing element can be repelled by the upper pole core and attracted by the lower pole core.

In an advantageous refinement, the armature, or the closing element with the magnet assembly, can be held in a floating state, which is situated between the two stable end positions, by means of the current intensity applied to the coil.

It should be noted that, as already mentioned, the solenoid valve has an upper pole core, a lower pole core and a closing element with a magnet assembly. It is clear from this and also from the further description that the solenoid valve does not have an armature in the conventional sense.

The coil is advantageously pushed onto the guide sleeve. Furthermore, the coil is advantageously premounted.

Energy-efficient switching of the valve is advantageously rendered possible by the described design of the valve. This efficiency has a far-reaching influence on further components too. Therefore, for example, considerably smaller coils are required, or possible. As a result, the amount of copper used, and therefore costs, can be reduced in turn. Furthermore, heat-dissipating parts, in particular in the controller, can also be dispensed with. In addition to the increased efficiency, the solenoid valve is also distinguished by its simplicity. For example, a very simple design with few components is possible. This leads to cost-effective and resource-optimized production. Advantages in respect of a smaller installation space can also be achieved.

In an advantageous embodiment, the bistable solenoid valve is characterized in that the magnet assembly is molded onto the closing element.

This is understood to mean that the magnet assembly and the closing element form a unit. As a result, expenditure on mounting can advantageously be reduced. Production can take place, for example, by means of an injection-molding method. An interlocking connection can be rendered possible in this way. Therefore, a fixed and non-releasable connection is advantageously created. As an alternative to a molded-on magnet assembly, the closing element can also have an injection-molded magnet assembly. For example, the closing element composed of plastic can have two injection-molded permanent magnets which are separated by an insulation.

In one possible refinement, the bistable solenoid valve is characterized in that the magnet assembly has, on a side of the magnet assembly which faces the upper pole core and also on a side of the magnet assembly which faces the lower pole core, magnetic poles with the same polarity, in particular has in each case a magnetic south pole or in each case a magnetic north pole.

This is understood to mean that the magnet assembly has the same magnetic pole at its two axial ends in the movement direction. That is to say, either a magnetic south pole or a magnetic north pole at both ends. These axial ends are to be understood with respect to the movement direction of the assembly or of the closing element. In this sense, the ends correspond to the end sides of the magnet assembly. The desired effect (repulsion and attraction of the pole cores with respect to the magnet assembly in the event of energization of the coil) can advantageously be achieved in a simple manner, without complicated control of the coil and also without complex design of the coil, by a configuration of this kind.

In a preferred embodiment, the bistable solenoid valve is characterized in that the magnet assembly comprises a plurality of permanent magnets, in particular two permanent magnets.

This is understood to mean that two or more permanent magnets form the assembly. To this end, the permanent magnets are designed, for example, as disk-type magnets. For the purpose of receiving the closing element and connection to said closing element, the permanent magnets can have a hole in the center, the closing element extending through said hole. A cost-effective and simple design can advantageously be rendered possible by a design and configuration of this kind.

In an alternative development, the bistable solenoid valve is characterized in that the permanent magnets are positioned oppositely.

This is understood to mean that the permanent magnets are oriented with in each case the same magnetic poles to one another; for example that two permanent magnets are arranged in relation to one another such that the magnetic south pole of a first permanent magnet and the magnetic south pole of a second permanent magnet are oriented toward one another. Therefore, the magnetic poles in the assembly with two permanent magnets are, for example, as follows: north-south, south-north. The desired effects can advantageously be achieved in a simple manner in this way.

In an advantageous refinement, the bistable solenoid valve is characterized in that the permanent magnets are separated by an insulation.

This is understood to mean that the magnet assembly has an insulation which is positioned between two permanent magnets. An improvement in efficiency and performance is advantageously achieved in this way.

In one possible embodiment, the bistable solenoid valve is characterized in that the lower non-moving pole core is pressed into the guide sleeve.

This is understood to mean that the pole core is fixed in the guide sleeve by means of pressing. Simple and cost-effective assembly can be rendered possible in this way.

Furthermore, variation of the press-in depth is possible in this way. Optimized matching of the position of the closing element and the valve seat can advantageously be achieved in this way. This allows, for example, production inaccuracies of the components to be taken into account and compensated for. In an alternative embodiment, attachment by welding can also be provided.

In a preferred development, the bistable solenoid valve is characterized in that the lower pole core is positioned such that it is at least partially located within the coil, and/or in that the upper pole core is positioned such that it is at least partially located within the coil.

This is to be understood to mean that the length and position of the coil and/or the length and position of the pole cores are matched to one another and possibly adapted to one another such that the lower pole core and also the upper pole core are located axially within the coil at least in regions. Optimization of the degree of efficiency in respect of the magnetization of the pole cores can advantageously be achieved in this way.

In an alternative embodiment, the bistable solenoid valve is characterized in that the closing element is guided through an opening in the lower pole core.

This is to be understood to mean that the lower pole core has an opening. Said opening is dimensioned such that the closing element is guided through this opening. Furthermore, provision can be made for this opening to render possible guidance for the closing element. An accurate fit of the closing element on the valve seat can advantageously be rendered possible by guidance of this kind. Good sealing in the closed valve state is achieved in this way. Furthermore, this advantageously renders it possible to dispense with or to avoid additional components for guiding the closing element.

In an advantageous development, the bistable solenoid valve is characterized in that the closing element consists of non-magnetizable material, in particular plastic.

Power- and efficiency-reducing effects during the opening and closing process can advantageously be avoided as a result.

The disclosure furthermore provides a method for controlling a bistable solenoid valve characterized in that energization of the solenoid valve in a first current direction leads to magnetization of the upper and the lower pole core in such a way that the upper pole core repels a permanent magnet, which is associated with it, of the magnet assembly and the lower pole core attracts a permanent magnet, which is associated with it, of the magnet assembly, and also energization of the solenoid valve in a second current direction leads to magnetization of the upper and the lower pole core in such a way that the lower pole core repels a permanent magnet, which is associated with it, of the magnet assembly and the upper pole core attracts a permanent magnet, which is associated with it, of the magnet assembly.

This is understood to mean that control of the valve, in particular control of the energization of the coils, is performed in such a way that a plurality of force components which assist a movement of the closing element from one position to a second position are generated. Energy-efficient switching is advantageously rendered possible in this way.

The disclosure furthermore provides a method for assembling a bistable solenoid valve comprising a guide sleeve and comprising an upper pole core and a lower pole core and a closing element with a magnet assembly, which method is characterized in that the upper pole core is connected to the guide sleeve in a first step, and the closing element is positioned in the lower pole core in a second step, and the closing element, together with the lower pole core, is inserted into the guide sleeve in a third step, and the lower pole core, together with the closing element, is positioned in the guide sleeve and connected to said guide sleeve in a fourth step, or the upper pole core is connected to the guide sleeve in a first step, and the closing element is positioned in the guide sleeve in a second step, and the lower pole core is inserted into the guide sleeve in a third step, and the lower pole core is positioned in the guide sleeve and connected to said guide sleeve in a fourth step.

This is understood to mean a method for assembling a bistable valve comprising a guide sleeve and comprising an upper pole core and a lower pole core and a closing element with a magnet assembly according to the present description, wherein firstly the upper pole core is connected to the guide sleeve and then the closing element, together with the lower pole core, is inserted into the guide sleeve and the lower pole core is connected to the guide sleeve. As an alternative, provision is made for firstly the upper pole core to be connected to the guide sleeve and then the closing element to be inserted into the guide sleeve and then the lower pole core to be inserted into the guide sleeve and connected. Simple assembly of the valve is advantageously rendered possible in this way.

The disclosure furthermore provides a hydraulic brake system for a motor vehicle, comprising at least one bistable solenoid valve according to the present description for controlling a brake fluid.

This is understood to mean that, for example, an automated parking brake system containing a hydraulic brake fluid can incorporate the described bistable valve. As a result, the solenoid valve can be held in an open or closed position. Furthermore, the changeover from one position to the other position advantageously takes place in a very efficient manner. Similarly, the development of noise and vibrations can be largely reduced or even avoided owing to the avoidance of continuous energization for holding a position.

BRIEF DESCRIPTION OF THE DRAWINGS

It should be noted that the features which are presented individually in the description can be combined with one another in any desired, technically appropriate manner and indicate further refinements of the disclosure. Further features and expediencies of the disclosure can be found in the description of exemplary embodiments with reference to the appended figures.

In the figures.

DETAILED DESCRIPTION

Figure 1:
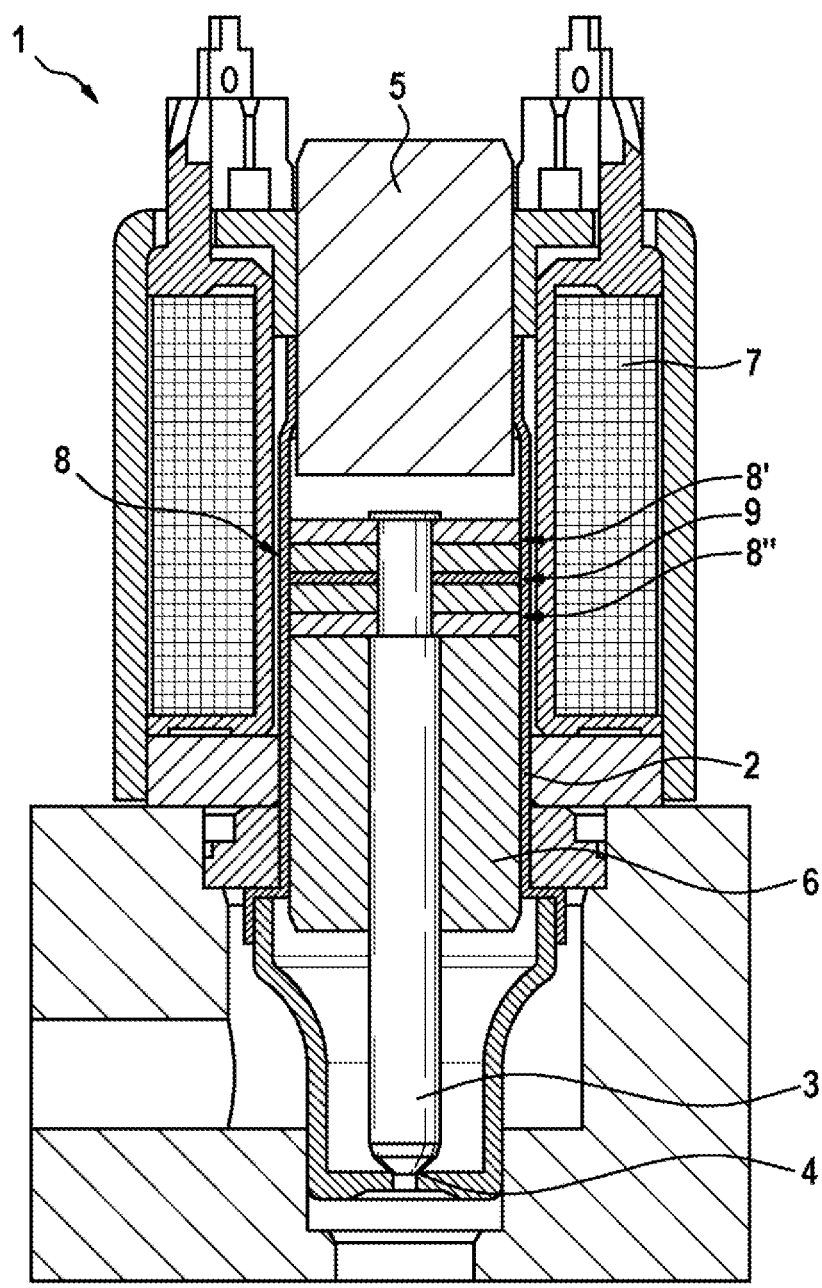
FIG. 1 shows a schematic sectional view of a bistable solenoid valve according to one embodiment of the disclosure.

FIG. 1 shows a schematic sectional view of a bistable solenoid valve. In this case, the solenoid valve 1 has a guide sleeve 2. An upper pole core 5 and a lower pole core 6 are anchored in said guide sleeve 2. Furthermore, a closing element 3 is positioned in a movable manner in the guide sleeve 2. A magnet assembly 8 is connected to said closing element 3 in a fixed manner. Said magnet assembly 8 consists of two permanent magnets 8' and 8". The two permanent magnets 8' and 8" are separated from one another by an insulation 9. In a lower position, the closing element 3 interacts with the valve seat 4 in a sealing manner, as illustrated in FIG. 1. In the event of a deflection out of said position, the closing element 3 releases the valve seat 4 and allows a hydraulic medium to flow. In this case, the closing element 3 runs through a hole in the lower pole core 6 and is guided in this way. Furthermore, a coil 7 is pushed onto the guide sleeve 2. Said coil 7 encloses the entire periphery of the guide sleeve 2. The length of the coil 7 or the position of the upper pole core 5 and lower pole core 6 are selected, or matched to one another, such that the coil 7 at least partially encloses the upper pole core 5 and the lower pole core 6. In this case, the pole cores 5, 6 each protrude into the field coil, that is to say the coil 7, and fill part of the length of said coil.

Figure 2:
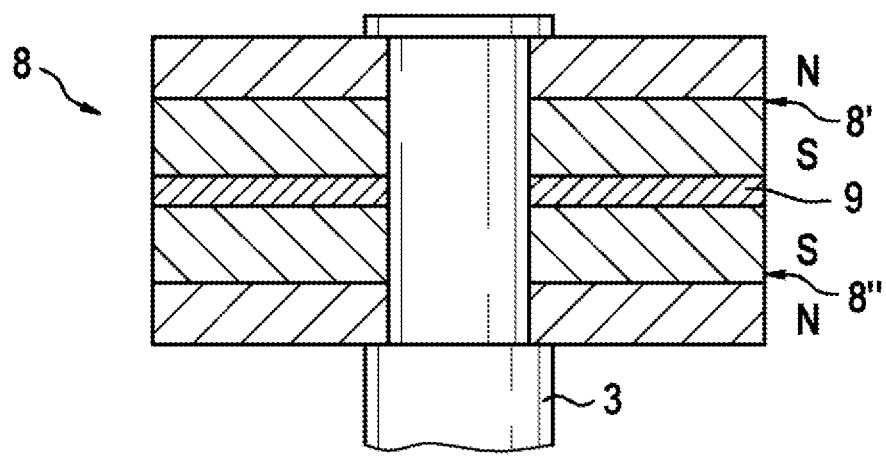
FIG. 2 shows a view of a detail of the closing element and of the magnet assembly according to one embodiment of the disclosure.

FIG. 2 shows a view of a detail of a closing element and of the magnet assembly. In this case, the permanent magnet assembly 8 is formed from an upper permanent magnet 8' and a lower permanent magnet 8". The two permanent magnets 8' and 8" are arranged in a manner separated from one another by the insulation 9. Furthermore, the permanent magnets 8' and 8" have a hole through which the closing element 3 is guided. In this case, the closing element 3 is formed from plastic. By way of example, an injection-molding method is used for production. A fixed connection between the magnet assembly 8 and the closing element 3 is ensured by molding-on and undercutting.

Figure 3:
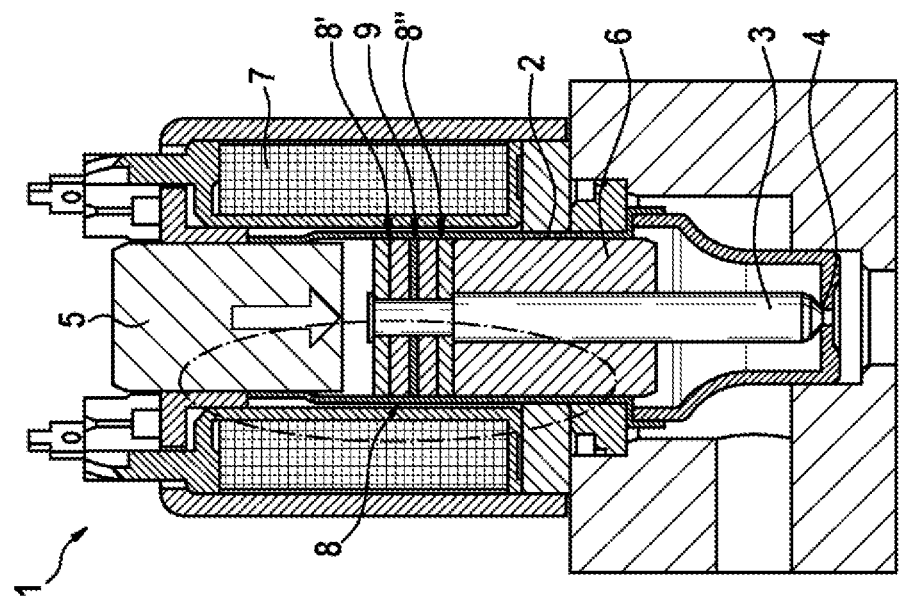
FIG. 3 shows a basic outline of the effective forces and movements given different energization according to one embodiment of the disclosure.
Figure 3:
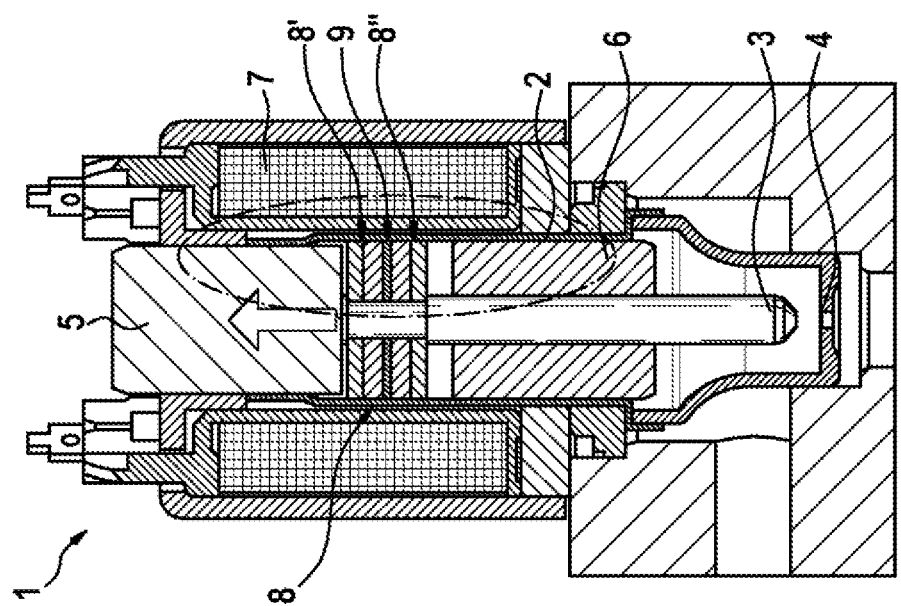

FIG. 3 shows a basic outline of the effective forces and movements given different energization. In this case, the illustration on the left-hand side shows a magnetic field line of a resulting magnetic field and effective forces given first energization. Here, a polarized magnetic field is generated by means of applying a defined first (for example positive) voltage to the coil 7. The illustrated oval line shows, by way of example, a magnetic field line. The upper pole core 5 and the lower pole core 6 are also magnetized by said magnetic field. The magnetization of the pole cores (and also the magnetic field which is generated by the coil 7) leads to interaction with the magnet assembly 8. For example, the magnet assembly 8 (more precisely the lower permanent magnet 8") is repelled by the lower pole core 6 which is magnetized in a polarized manner. At the same time, the magnet assembly 8 (more precisely the upper permanent magnet 8') is attracted by the upper pole core 5 which is magnetized in a polarized manner. This results in a movement of the axially movable magnet assembly 8, and also of the closing element 3 which is connected to said magnet assembly in a fixed manner, to the upper position. This force and also the resulting movement are illustrated by the upwardly directed arrow. In the upper position, the closing element 3 is held by the magnetic force of the magnet assembly 8 (in particular of the upper permanent magnet 8') even after the energization of the coil 7 is removed. Therefore, the solenoid valve 1 is in a stable open state. Furthermore, the illustration on the right-hand side of FIG. 3 shows the magnetic field and effective forces given second energization. Here, a magnetic field which is polarized oppositely to the first defined voltage is generated by means of applying a defined second (for example negative) voltage to the coil 7. In an analogous manner to the previous description, the magnet assembly 8 (more precisely the upper permanent magnet 8') is repelled by the upper pole core 5 which is magnetized in an oppositely polarized manner. At the same time, the magnet assembly 8 (more precisely the lower permanent magnet 8") is attracted by the lower pole core 6 which is magnetized in an oppositely polarized manner. This results in a movement of the axially movable magnet assembly 8, and also of the closing element which is connected to said magnet assembly in a fixed manner, to the lower position. In the lower position, the closing element is held by the magnetic force of the magnet assembly 8 (in particular of the lower permanent magnet 8") even after the energization of the coil 7 is removed. Therefore, the solenoid valve 1 is in a stable closed state.

The invention claimed is:
1. A bistable solenoid valve for a hydraulic brake system, comprising:
 a guide sleeve;
 an upper pole core fixedly arranged in the guide sleeve;
 a valve seat;
 a closing element movably arranged in the guide sleeve and configured to enter the valve seat during a closing movement and lift out of the valve seat during an opening movement;
 a magnet assembly to which the closing element is fixedly connected, the magnet assembly comprising two permanent magnets separated from one another by an insulation that magnetically insulates the two permanent magnets from one another;
 a coil positioned around the guide sleeve and substantially enclosing the guide sleeve, the coil configured to actuate movement of the closing element via the magnet assembly; and
 a lower pole core fixedly arranged in the guide sleeve, the magnet assembly positioned between the lower pole core and the upper pole core,
 wherein the bistable solenoid valve is configured such that:
  energizing the coil in a first current direction magnetizes the upper pole core and the lower pole core in such a way that the upper pole core repels the magnet assembly and the lower pole core attracts the magnet assembly; and
  energizing the coil in a second current direction magnetizes the upper pole core and the lower pole core in such a way that the lower pole core repels the magnet assembly and the upper pole core attracts the magnet assembly.
2. The bistable solenoid valve as claimed in claim 1, wherein the magnet assembly is molded onto the closing element.

3. The bistable solenoid valve as claimed in claim 1, wherein the magnet assembly has a first side facing the upper pole core and a second side facing the lower pole core, the first and second sides having magnetic poles with the same polarity.
4. The bistable solenoid valve as claimed in claim 1, wherein the two permanent magnets are positioned oppositely relative to one another such that an upper side of a first one of the two permanent magnets and a lower side of a second one of the two permanent magnets have the same polarity.
5. The bistable solenoid valve as claimed in claim 1, wherein the lower non-moving pole core is pressed into the guide sleeve.
6. The bistable solenoid valve as claimed in claim 1, wherein at least one of the lower pole core and the upper pole core is positioned at least partially within the coil.
7. The bistable solenoid valve as claimed in claim 1, wherein the closing element consists of non-magnetizable material.
8. A method for controlling a bistable solenoid valve that includes a guide sleeve; an upper pole core fixedly arranged in the guide sleeve; a valve seat; a closing element movably arranged in the guide sleeve and configured to enter the valve seat during a closing movement and lift out of the valve seat during an opening movement; a magnet assembly to which the closing element is fixedly connected, the magnet assembly including two permanent magnets separated from one another by an insulation that magnetically insulates the two permanent magnets from one another; a coil positioned around the guide sleeve and substantially enclosing the guide sleeve, the coil configured to actuate movement of the closing element via the magnet assembly; and a lower pole core fixedly arranged in the guide sleeve, the magnet assembly positioned between the lower pole core and the upper pole core, the method comprising:
 energizing the coil in a first current direction to magnetize the upper pole core and the lower pole core in such a way that the upper pole core repels the magnet assembly and the lower pole core attracts the magnet assembly; and
 energizing the coil in a second current direction to magnetize the upper pole core and the lower pole core in such a way that the lower pole core repels the magnet assembly and the upper pole core attracts the magnet assembly.
9. A method for assembling a bistable solenoid valve that includes a guide sleeve; an upper pole core fixedly arranged in the guide sleeve; a valve seat; a closing element movably arranged in the guide sleeve and configured to enter the valve seat during a closing movement and lift out of the valve seat during an opening movement; a magnet assembly to which the closing element is fixedly connected, the magnet assembly comprising two permanent magnets separated from one another by an insulation that magnetically insulates the two permanent magnets from one another; a coil positioned around the guide sleeve and substantially enclosing the guide sleeve, the coil configured to actuate movement of the closing element via the magnet assembly; and a lower pole core fixedly arranged in the guide sleeve, the magnet assembly positioned between the lower pole core and the upper pole core, the upper and lower pole cores and the magnet assembly are configured such that energizing the coil in a first current direction magnetizes the upper pole core and the lower pole core in such a way that the upper pole core repels the magnet assembly and the lower pole core attracts the magnet assembly, and energizing the coil in a second current direction magnetizes the upper pole core and the lower pole core in such a way that the lower pole core repels the magnet assembly and the upper pole core attracts the magnet assembly, the method comprising:

(i) connecting the upper pole core to the guide sleeve, (ii) positioning the closing element in the lower pole core, (iii) after positioning the closing element in the lower pole core, inserting the closing element, together with the lower pole core, into the guide sleeve that is connected to the upper pole core, (iv) after inserting the closing element, positioning the lower pole core, together with the closing element, in the guide sleeve, and (v) connecting the positioned lower pole core and the closing element to said guide sleeve; or (i) connecting the upper pole core to the guide sleeve, (ii) positioning the closing element in the guide sleeve, (iii) inserting the lower pole core into the guide sleeve, (iv) positioning the inserted lower pole core in the guide sleeve, and (v) connecting the positioned lower pole core to said guide sleeve.

10. A hydraulic brake system for a motor vehicle, comprising at least one solenoid valve configured as the bistable solenoid valve as claimed in claim 1, the at least one solenoid valve configured for controlling a brake fluid.

11. The bistable solenoid valve as claimed in claim 3, wherein the first and second sides of the magnet assembly both have magnetic south pole or magnetic north pole polarity.

12. The bistable solenoid valve as claimed in claim 7, wherein the closing element consists of non-magnetizable plastic.

13. The bistable solenoid valve as claimed in claim 1, wherein the two permanent magnets include an upper permanent magnet and a lower permanent magnet, and the bistable solenoid valve is configured such that, when the coil is energized in the first current direction the upper pole core repels the upper permanent magnet and the lower pole core attracts the lower permanent magnet, and when the coil is energized in the second current direction the upper pole core attracts the upper permanent magnet and the lower pole core repels the lower permanent magnet.

14. The method as claimed in claim 8, wherein, when the coil is energized in the first current direction the upper pole core repels an upper permanent magnet of the two permanent magnets and the lower pole core attracts a lower permanent magnet of the two permanent magnets, and when the coil is energized in the second current direction the upper pole core attracts the upper permanent magnet and the lower pole core repels the lower permanent magnet.

* * * * *